(12) United States Patent
Kim et al.

(10) Patent No.: US 11,312,456 B1
(45) Date of Patent: Apr. 26, 2022

(54) FLOATING STRUCTURE FOR SOLAR POWER GENERATING ON WATER

(71) Applicant: TECHWIN CO., LTD., Cheongju-si (KR)

(72) Inventors: Jung Sik Kim, Sejong-si (KR); Yong Young Kim, Cheongju-si (KR); Hyun Su Shin, Daejeon (KR); Dong Yeop Lee, Cheongju-si (KR); Byeung Jin Kim, Daejeon (KR); Yeon June Sung, Cheongju-si (KR)

(73) Assignee: TECHWIN CO., LTD., Cheongju-si (KR)

( * ) Notice: Subject to any disclaimer, the term of this patent is extended or adjusted under 35 U.S.C. 154(b) by 0 days.

(21) Appl. No.: 17/157,167

(22) Filed: Jan. 25, 2021

(30) Foreign Application Priority Data

Dec. 24, 2020 (KR) .......................... 10-2020-0183890

(51) Int. Cl.
  *B63B 35/44* (2006.01)
  *H02S 10/40* (2014.01)

(52) U.S. Cl.
  CPC .............. *B63B 35/44* (2013.01); *H02S 10/40* (2014.12); *B63B 2035/4453* (2013.01); *B63B 2207/00* (2013.01); *B63B 2221/08* (2013.01)

(58) Field of Classification Search
  CPC . B63B 35/44; B63B 2207/00; B63B 2221/08; B63B 2035/4453; H02S 10/40
  See application file for complete search history.

(56) References Cited

U.S. PATENT DOCUMENTS

2020/0407027 A1\* 12/2020 Sheerer .................. B63B 32/73

FOREIGN PATENT DOCUMENTS

| JP | 2020-036398 A | 3/2020 |
| KR | 10-2016-0108974 A | 9/2016 |
| KR | 10-2017295 B1 | 9/2019 |

(Continued)

OTHER PUBLICATIONS

"Notice of Final Rejection" Office Action issued in KR 10-2020-0183890; mailed by the Korean Patent Office dated Aug. 18, 2021.
(Continued)

*Primary Examiner* — S. Joseph Morano
*Assistant Examiner* — Jovon E Hayes
(74) *Attorney, Agent, or Firm* — Studebaker & Brackett PC

(57) ABSTRACT

Provided is a floating structure for solar power generating on water. The floating structure includes: unit lines including a main buoyancy body and an auxiliary buoyancy body arranged in a transverse direction and being arranged in a longitudinal direction; a connection member that connects the main buoyancy body to the auxiliary buoyancy body so that the bottom surface of the main buoyancy body is located lower than the bottom surface of the auxiliary buoyancy body; and a platform that connects auxiliary buoyancy bodies included in adjacent unit lines in the longitudinal direction. One or more ends of the main buoyancy body and the auxiliary buoyancy body include a first fastening portion and a second fastening portion that fastens two or more of the main buoyancy body and the auxiliary buoyancy body, and the connection member includes a support portion and third fastening portions provided at ends of the support portion.

17 Claims, 11 Drawing Sheets

(56) References Cited

FOREIGN PATENT DOCUMENTS

| KR | 10-2020-0048208 A | 5/2020 | |
|---|---|---|---|
| WO | WO-9946543 A1 * | 9/1999 | ............... F24J 2/07 |
| WO | WO-2009136212 A2 * | 11/2009 | ............ B63B 35/44 |
| WO | 2016/136891 A1 | 12/2017 | |

OTHER PUBLICATIONS

"Request for the Submission of an Opinion" Office Action issued in KR 10-2020-0183890; mailed by the Korean Patent Office dated May 10, 2021.

* cited by examiner

FLOATING STRUCTURE FOR SOLAR POWER GENERATING ON WATER

CROSS-REFERENCE TO RELATED APPLICATION

This application claims priority to and the benefit of Korean Patent Application No. 10-2020-0183890, filed on Dec. 24, 2020, the disclosure of which is incorporated herein by reference in its entirety.

BACKGROUND

1. Field of the Invention

The present invention relates to a floating structure for solar power generating on water. This work was supported by the New & Renewable Energy Core Technology of the Korea Energy Technology Evaluation and Planning (KETEP) granted financial resource from the Ministry of Trade, Industry and Energy, Republic of Korea (1415169143, 20203040010240, "Development and demonstration of localization of components and materials for low-cost LCOE of offshore floating solar system").

2. Discussion of Related Art

Solar cells are electrochemical devices that convert light energy from the sun into electrical energy. The smallest unit that generates electricity using a photoelectric effect is called a cell, and what generates power by connecting a plurality of cells in series or in parallel is called a solar module.

A solar power generating plant is an assembly of structures in which a plurality of solar modules are connected in series or in parallel. Such a solar power generating plant is generally installed on land, which incurs enormous site purchase and construction costs, and the environment is destroyed because hillsides are mainly cut to be used as a site. In addition, when installed on land, solar modules are heated by geothermal heat in summer, so that the solar modules cannot be effectively cooled, which is a factor that lowers the power generation efficiency of the solar modules.

In order to solve such a problem, solar power generating systems on water, in which solar modules are installed on water such as lakes, rivers, ponds, dams, and oceans, have been developed. Such a solar power generating system on water is a power generating system using a plurality of floating structures for solar power generating on water in which a plurality of solar modules installed on the water surface together with a buoy are arranged.

The plurality of floating structures need to be connected to each other in a rigid state. Each of the floating structures includes a main buoyancy body for fixing a solar module floating on the water surface while the solar module is fixed, and an auxiliary buoyancy body that supplements the buoyancy of the main buoyant body and is installed on the water surface so that a worker can move around the solar module, as needed, wherein the main buoyancy body and the auxiliary buoyancy body may be connected to each other by a predetermined connection member.

Since a portion of the main buoyancy body and the auxiliary buoyancy body is submerged in water, water is confined in the inner space formed by the connected buoyancy bodies. Since the movement, flow, circulation, etc., of the water trapped in the inner space are blocked, contaminants introduced into the inner space may not escape to the outside of the inner space and may be stagnant. When such contaminants are attached to the solar module, energy production efficiency may be lowered.

In addition, in the summer when the water temperature rises, green algae is generated and intensified in the vicinity of the buoyant body constituting the solar power generating system on water due to the increase in the temperature of the solar module and the increase in ambient radiant heat.

On the other hand, when such a solar power generating system is applied to the sea, the load applied to the buoyant body supporting the solar module may relatively greatly increase depending on climate change, wave strength, and height, etc., as compared to the case the case where the solar power generating system is applied to fresh water such as lakes and reservoirs. Thus, the buoyancy body usually made of plastic or synthetic resin may be destroyed or damaged by an external impact such as a wave, and when the buoyant body is greatly damaged, the buoyancy and supporting power provided to the solar module may be lost, and thus, the solar module could be submerged.

SUMMARY OF THE INVENTION

The present invention is directed to a floating structure for solar power generating on water in which the concern of environment pollution that may occur around a solar power generating system on water can be eliminated and, at the same time, resistance against external force and durability are improved.

According to an aspect of the present invention, there is provided a floating structure for solar power generating on water, the floating structure including two or more unit lines including at least one main buoyancy body and at least one auxiliary buoyancy body arranged in a transverse direction, the two or more unit lines being arranged in a longitudinal direction, a connection member configured to connect the main buoyancy body to the auxiliary buoyancy body so that the bottom surface of the main buoyancy body is located lower than the bottom surface of the auxiliary buoyancy body, and a platform configured to connect two or more auxiliary buoyancy bodies included in adjacent unit lines in the longitudinal direction, wherein one or more ends of the main buoyancy body and the auxiliary buoyancy body include a first fastening portion and a second fastening portion configured to fasten two or more of the main buoyancy body and the auxiliary buoyancy body, and the connection member includes a support portion and third fastening portions provided at both ends of the support portion.

A bottom surface of the main buoyancy body may include a first concave portion formed in a direction perpendicular to the unit lines.

A bottom surface of the main buoyancy body may include a second concave portion formed in a direction parallel to the unit lines.

A top surface of at least one of the first and second concave portions may be located higher than a bottom surface of the auxiliary buoyancy body.

The connection member may connect the main buoyancy body and the auxiliary buoyancy body included in the unit lines to each other in the transverse direction, and an angle θ formed by an extension line of the fastening portion and the support portion may be 90° or less.

The connection member may connect adjacent unit lines in the longitudinal direction.

Both side ends of the connection member facing the main buoyancy body and the auxiliary buoyancy body may include ⊂-shaped bent portions bent in opposite directions.

At least one surface of at least one of the first to third fastening portions may include at least one concave groove.

The support portion may include a metal plate.

The support portion may include a leaf spring in which two or more metal plates having different lengths are stacked.

The support portion may include a resin leaf spring whose thickness decreases in a direction from a center to both ends.

The platform and the auxiliary buoyancy body may be coupled by a fourth fastening portion that rotates around at least one axis.

The floating structure may further include a connection pin inserted into a portion where two or more of the first to third fastening portions overlap, wherein the connection pin includes a first head portion, a shank portion, a first threaded portion, and two or more reinforcing ribs provided at predetermined intervals in a circumferential direction of a hollow at at least a portion of an inner wall of the hollow passing through the first head portion, the shank portion, and the first threaded portion.

The connection pin may further include a reinforcing member located on an outer circumferential surface of the shank portion so as to reinforce the shank portion.

A diameter of the reinforcing member may be greater than a diameter of the first threaded portion, and one end of the reinforcing member may further include a tapered portion extending to the first threaded portion while a diameter of the tapered portion gradually decreases.

The other end of the reinforcing member may include a reinforcing flange formed in a circumferential direction so as to reinforce the first head portion of the connection pin.

The connection pin may further include a core reinforcing member, which is inserted into the hollow while in contact with the reinforcing ribs, so as to reinforce the shank portion.

The core reinforcing member may include a second head portion and a body portion extending from the second head portion.

A surface of the first head portion facing at least one of the first to third fastening portions may include at least one first protrusion formed in a circumferential direction.

The connection pin may further include a nut fastened to the first threaded portion, a surface of the nut facing at least one of the first to third fastening portions may include at least one second protrusion formed in a circumferential direction, and an inner circumferential surface of the nut may include a second threaded portion and a smooth portion having a greater diameter than a diameter of the second threaded portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
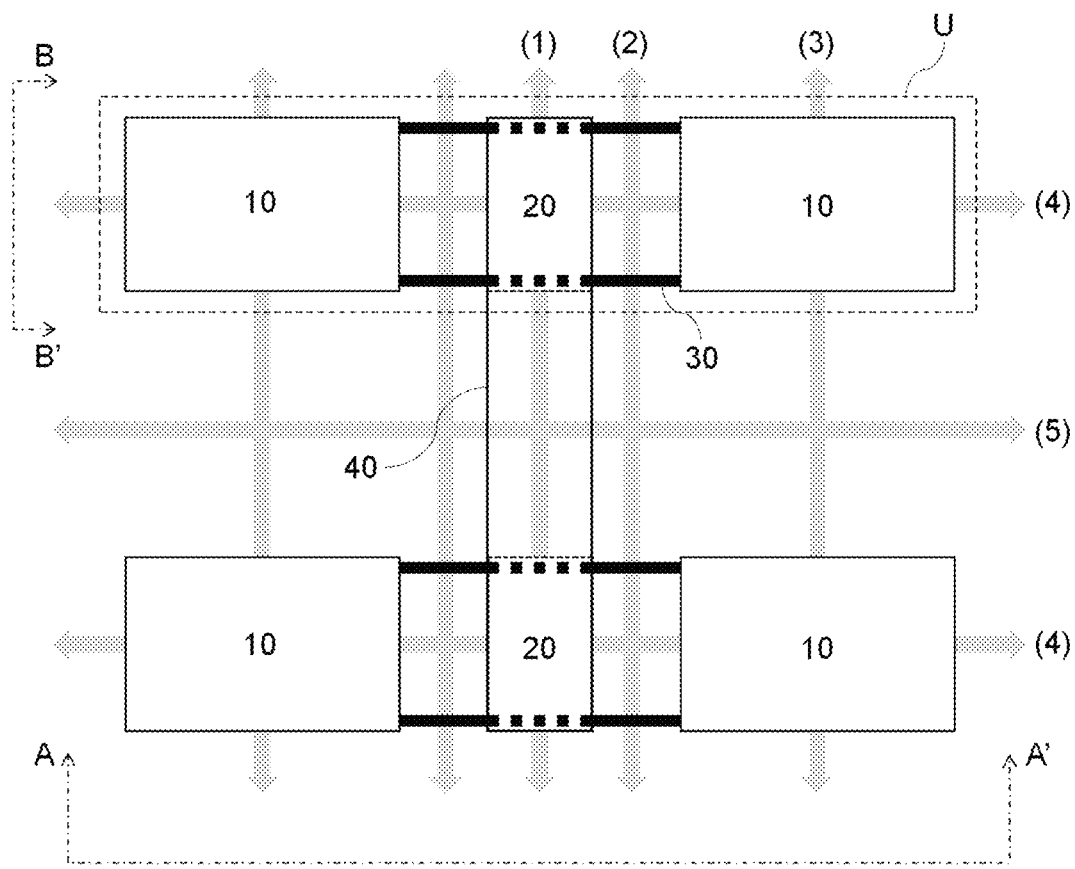
FIG. 1 is a plan view of a floating structure for solar power generating on water according to an embodiment of the present invention.

Hereinafter, the present invention will be described with reference to the accompanying drawings. However, the present invention may be implemented in many different forms, and therefore, the present invention is not limited to the embodiments described herein. In the drawings, portions irrelevant to the description are omitted so as to clearly describe the present invention, and similar reference numerals are assigned to similar portions throughout the specification.

Throughout the specification, when a portion is referred to as being "connected" to another portion, this includes not only "directly connected" but also "indirectly connected" with another member interposed therebetween. In addition, when a portion "includes" a certain component, this means that other components may be further provided, not excluding other components, unless specifically stated to the contrary.

Hereinafter, embodiments of the present invention will be described in detail with reference to the accompanying drawings.

A floating structure for solar power generating on water according to an aspect of the present invention includes two or more unit lines, the two or more unit lines including at least one main buoyancy body and at least one auxiliary buoyancy body arranged in a transverse direction and the two or more unit lines being arranged in a longitudinal direction, a connection member for connecting the main buoyancy body to the auxiliary buoyancy body so that the bottom surface of the main buoyancy body is located lower than the bottom surface of the auxiliary buoyancy body, and a platform for connecting two or more auxiliary buoyancy bodies included in adjacent unit lines in the longitudinal direction, wherein one or more ends of the main buoyancy body and the auxiliary buoyancy body include a first fastening portion and a second fastening portion for fastening two or more of the main buoyancy body and the auxiliary buoyancy body, and the connection member includes a support portion and a third fastening portion provided at both ends of the support portion.

Figure 2:
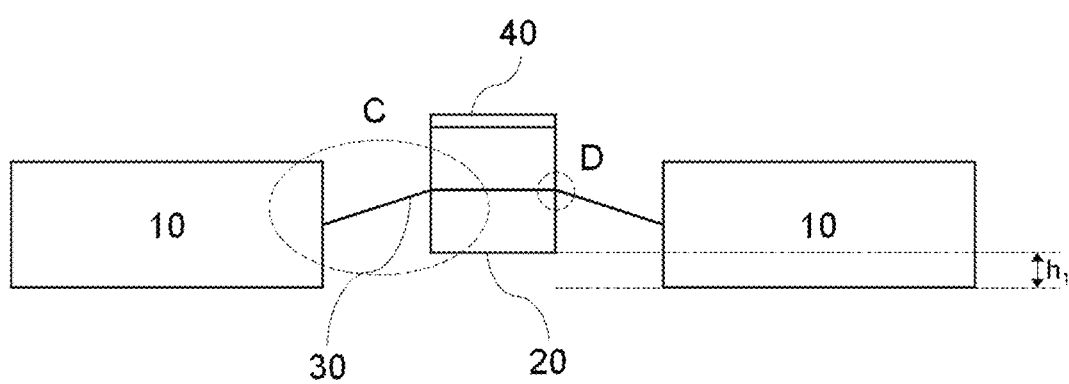
FIGS. 2 and 3 are side views of the floating structure for solar power generating on water viewed from a direction A-A' of FIG. 1.

FIG. 1 is a plan view of a floating structure for solar power generating on water according to an embodiment of the present invention, and FIG. 2 is a side view of the floating structure for solar power generating on water viewed from a direction A-A' of FIG. 1. Referring to FIGS. 1 and 2, the floating structure for solar power generating on water according to the embodiment of the present invention may include two or more unit lines U, the two or more unit lines U including at least one main buoyancy body 10 and at least one auxiliary buoyancy body 20 arranged in a transverse direction and the two or more unit lines U being arranged in a longitudinal direction, a connection member 30 for connecting the main buoyancy body to the auxiliary buoyancy body 20 so that the bottom surface of the main buoyancy body 10 is located lower than the bottom surface of the auxiliary buoyancy body 20, and a platform 40 for connecting two or more main buoyancy bodies 10 and/or auxiliary buoyancy bodies 20 included in adjacent unit lines U in the longitudinal direction.

The main buoyancy body 10 may provide buoyancy required to fix and support a solar module installed thereon. At least one end of the main buoyancy body 10 may include one or more first fastening portions (see 10a of FIG. 11) into which a connection pin to be described below may be inserted.

The auxiliary buoyancy body 20 may provide buoyancy required to fix and support the platform 40 installed thereon. In addition, referring to FIG. 2, the bottom surface of the auxiliary buoyancy body 20 may be located at a height $h_1$ higher than the bottom surface of the main buoyancy body 10, and the height $h_1$ may be properly set in the range in which the freeboard of the main buoyancy body 10 and the auxiliary buoyancy body 20 may be secured.

Since the auxiliary buoyancy body 20 may be located in a state where the surface of the auxiliary buoyancy body 20 is not in contact with the (sea) water surface, water and/or air may be moved and circulated into a space (path 1 in FIG. 1) between the auxiliary buoyancy body 20 and the (sea) water surface. At least one end of the auxiliary buoyancy body 20 may include one or more second fastening portions (see 20a of FIG. 11) into which a connection pin to be described below may be inserted.

On the other hand, the specifications, material, shape, structure, etc. of the main buoyancy body 10 and the auxiliary buoyancy body 20 may be the same, and at least one of the specifications, material, shape, structure, etc. may be changed and applied, as needed.

The connection member 30 may connect the main buoyancy body 10 and the main buoyancy body 10, which are included in a single unit line U, in the transverse direction so that the bottom surface of the main buoyancy body 10 is located lower than the bottom surface of the auxiliary buoyancy body 20, and/or a single connection member 30 may connect two or more adjacent unit lines U in the longitudinal direction and connect the main buoyancy body 10 and the auxiliary buoyancy body 20, which are included in the unit lines U connected by the single connection member 30 in the longitudinal direction, in the transverse direction. In the latter case, since the first and second fastening portions (see 10a and 20a of FIG. 11) of each of the main buoyancy bodies 10 and the auxiliary buoyancy bodies 20, which are included in two unit lines U adjacent to the third fastening portion (see 33a of FIG. 10) positioned at both ends of the single connection member 30, may be coupled to each other, the number of connection members required for the construction of the floating structure for solar power generating on water and the resulting economic burden may be reduced.

Since the connection member 30 may also be located to be not in contact with the (sea) water surface, water and/or air may be moved and circulated into a space (path 2 in FIG. 1) between the connection member 30 and the (sea) water surface. At least both ends of the connection member 30 may include one or more third fastening portions (see 32, 33, and 33a of FIGS. 6A, 6B, 7, 10 and 11) into which a connection pin to be described below may be inserted.

The platform 40 may connect two or more auxiliary buoyancy bodies 20 included in adjacent unit lines U to each other so as to provide a moving path between the unit lines U for a worker. Since the platform 40 may be located in a state where the bottom surface of the platform 40 is not in contact with the (sea) water surface, water and/or air may be moved and circulated into a space (path 5 in FIG. 1) between the platform 40 and the (sea) water surface.

The platform 40 and the auxiliary buoyancy body 20 may be coupled by a fourth fastening portion (not shown) that rotates around at least one axis. The fourth fastening portion may be configured in such a way that the platform 40 and the auxiliary buoyancy body 20 rotate around at least one axis, preferably, two axes, and more preferably, three axes. In particular, the fourth fastening portion may be configured in such a way that the platform 40 and the auxiliary buoyancy body 20 rotate around three axes. In this case, since 6 degrees of freedom may be secured to the platform 40 and the auxiliary buoyancy body 20 in the coupled state, resistance against external force and the resulting stress and durability may be further improved.

The main buoyancy body 10 and/or the auxiliary buoyancy body 20 may be a plastic injection-molded product in which the inner space is empty, preferably, a plastic injection-molded product including a polyolefin resin, and more preferably a plastic injection-molded product including a polyethylene resin.

The inner space may be divided by one or more partition walls to improve durability of the main buoyancy body 10 and/or the auxiliary buoyancy body 20, as needed. Even when any one of a plurality of inner spaces partitioned by the partition walls is damaged, the main buoyancy body 10 and/or the auxiliary buoyancy body 20 may be prevented from losing their entire buoyancy. In addition, at least a portion of the plurality of inner spaces partitioned by the partition walls, preferably, the entire inner space may be filled with an arbitrary buoyancy body, so that, even when the surface of the main buoyancy body 10 and/or the auxiliary buoyancy body 20 is damaged, the main buoyancy body 10 and/or the auxiliary buoyancy body 20 may be prevented from losing their entire buoyancy.

Figure 3:
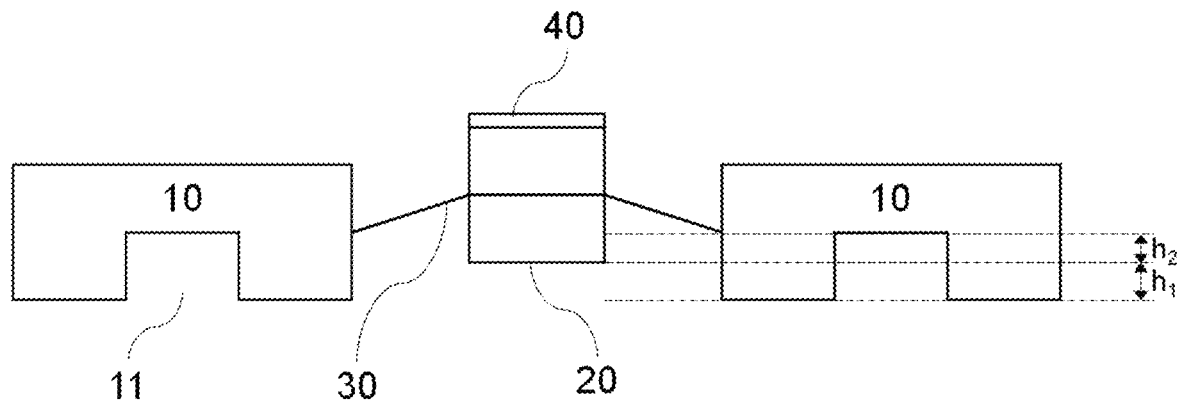

FIG. 3 is a side view of a floating structure for solar power generating on water viewed from a direction A-A' of FIG. 1. Referring to FIG. 3, the bottom surface of the main buoyancy body 10 may include a first concave portion 11 formed in a direction perpendicular to the unit line U. Since the first concave portion 11 may be located in a state where the top surface of the first concave portion 11 is not in contact with the (sea) water surface, water and/or air may be moved and circulated into a space (path 3 in FIG. 1) between the top surface and the (sea) water surface. The first concave portion 11 may be designed with appropriate specifications in consideration of the durability and freeboard of the main buoyancy body 10.

Figure 4:
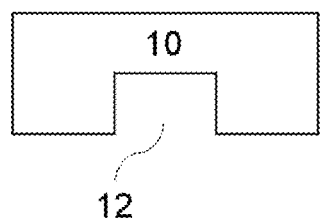
FIG. 4 is side view of the floating structure for solar power generating on water viewed from a direction B-B' of FIG. 1.

FIG. 4 is a side view of a floating structure for solar power generating on water viewed from a direction B-B' of FIG. 1. Referring to FIG. 4, the bottom surface of the main buoyancy body 10 may include a second concave portion 12 formed in a direction parallel to the unit line U. The second concave portion 12 may be combined with the first concave portion 11, as needed. In this case, the second concave portion 12 may be formed in a direction perpendicular to the first concave portion 11. Since the second concave portion 12 may be located in a state where the top surface of the second concave portion 12 is not in contact with the (sea) water surface, water and/or air may be moved and circulated into a space (path 4 in FIG. 1) between the top surface and the (sea) water surface. The second concave portion 12 may be designed with appropriate specifications in consideration of the durability and freeboard of the main buoyancy body 10.

Referring to FIG. 3, a top surface of at least one of the first and second concave portions 11 and 12 may be located higher than the bottom surface of the auxiliary buoyancy body 20. That is, the bottom surface of the auxiliary buoyancy body 20 may be located at the height $h_1$ higher than the bottom surface of the main buoyancy body 10, and the top surface of at least one of the first and second concave portions 11 and 12 may be located at a height $h_2$ higher than the bottom surface of the auxiliary buoyancy body 20.

The freeboard of the main buoyancy body 10 and/or the auxiliary buoyancy body 20 at sea may vary depending on climate change, wave strength, height, etc. In particular, it is difficult to properly secure such freeboard under extreme climatic conditions. In addition, when the volume of a portion submerged below the sea level is increased to secure freeboard, for example, when both the bottom surfaces of the main buoyancy body 10 and the auxiliary buoyancy body 20 are submerged below the sea level, water and air may not be smoothly moved and circulated in a direction perpendicular to the unit line U, and thus, the burden from seawater pollution may be increased.

On the other hand, the heights of the bottom surfaces of the main buoyancy body 10 and the auxiliary buoyancy body 20 and the top surface of the first and/or second concave portions 11 and 12 may be designed as described above, so that, even under extreme climate conditions, the bottom surface of the main buoyancy body 10, the bottom surface of the auxiliary buoyancy body 20 and the top surface of the first and/or second concave portions 11 and 12 may be sequentially submerged below the sea level. In particular, the freeboard may be properly secured while the bottom surfaces of the main buoyancy body 10 and the auxiliary buoyancy body 20 are submerged below the sea level, and water and air may be properly moved and circulated through the first and/or second concave portions 11 and 12.

Figure 5:
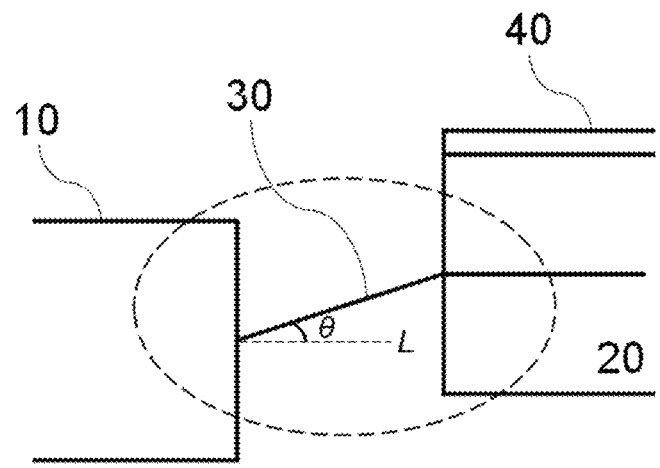
FIG. 5 is an enlarged view of region C of FIG. 2.
Figure 6A:
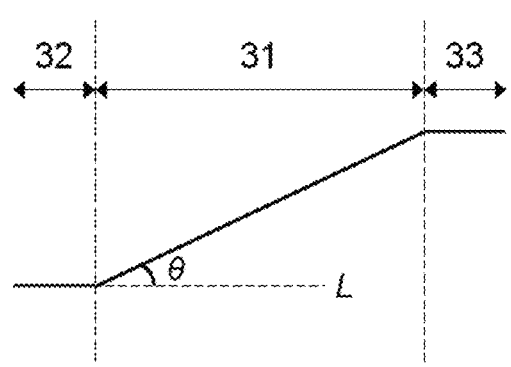
FIGS. 6A and 6B show a connection member according to an embodiment of the present invention.
Figure 6B:
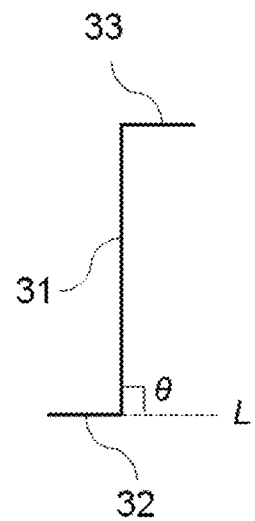

FIG. 5 is an enlarged view of region C of FIG. 2, and FIGS. 6A and 6B show a connection member 30 according to an embodiment of the present invention. Referring to FIGS. 5, 6A, and 6B, the connection member 30 may connect the main buoyancy body 10 and the auxiliary buoyancy body 20, which are included in the unit line U, in the transverse direction, and the connection member 30 may include a support portion 31 and third fastening portions 32 and 33 provided at both ends of the support portion 31, and an angle θ formed by an extension line L of the third fastening portions 32 and 33 and the support portion 31 may be 90° or less, and preferably 60° or less.

The angle θ formed by the extension line L of the third fastening portions 32 and 33 and the support portion 31 may be properly adjusted according to the specifications of the main buoyancy body 10 and/or the auxiliary buoyancy body 20, the position of the first and/or the second fastening portions 10a and 20a provided at at least one end of the main buoyancy body 10 and/or the auxiliary buoyancy body 20, and the length of the support portion 31 of the connection member 30, etc.

However, when the angle θ is greater than 90° and when the support portion 31 and the third fastening portions 32 and 33 provided at both ends of the support portion 31 are integrally formed, the third fastening portions 32 and 33 may be excessively bent. Such excessive bending may significantly reduce the strength of a bent portion, and it is difficult to remove contaminants deposited on the bent portion for a long period of time.

Figure 7:
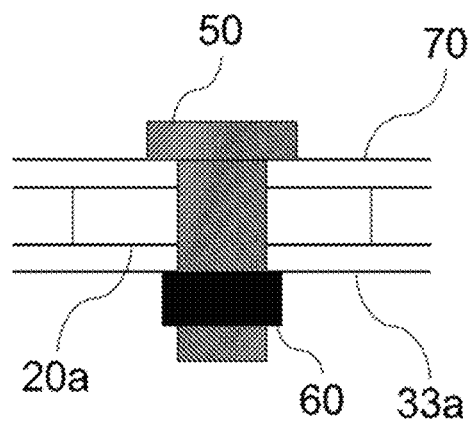
FIG. 7 is an enlarged view of region D of FIG. 2.

FIG. 7 is an enlarged view of region D of FIG. 2. Referring to FIG. 7, the second fastening portion 20a of the auxiliary buoyancy body 20 may be located on the third fastening portion 33a of the connection member 30, and a predetermined connection pin 50 may be inserted into at least one through hole provided in the second and third fastening portions 20a and 33a, and a predetermined nut 60 may be fastened to a first threaded portion of the connection pin 50. A washer 70 capable of reinforcing the airtightness of a head portion of the connection pin 50 and/or the nut 60 and the resulting coupling force may be interposed at any position between the head portion and the nut 60, as needed. The surface of the washer 70 may have a concave-convex structure capable of accommodating concave grooves of a fastening portion, protrusions of a connection pin, and/or protrusions of a nut to be described below. The connection pin 50 and the nut 60 will be described below.

Figure 8:
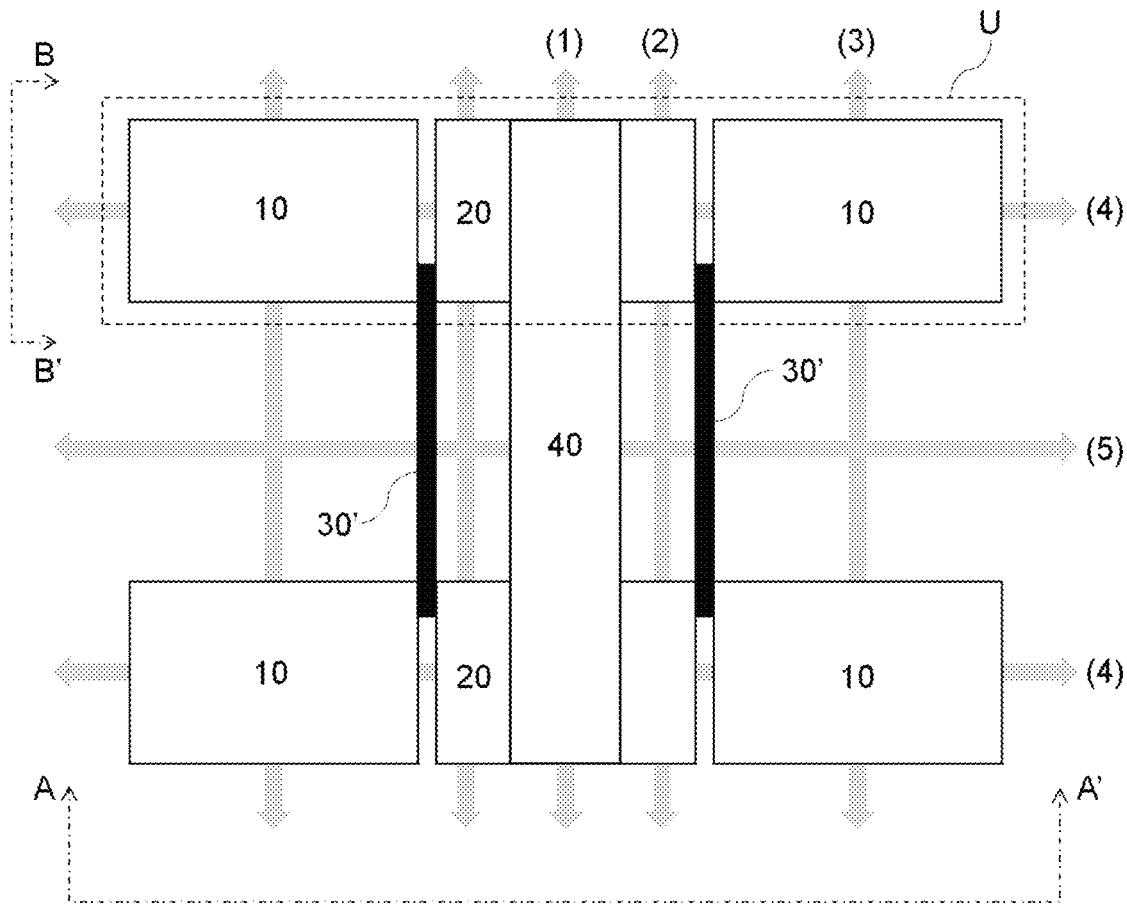
FIG. 8 is a plan view of a floating structure for solar power generating on water according to another embodiment of the present invention.
Figure 9:
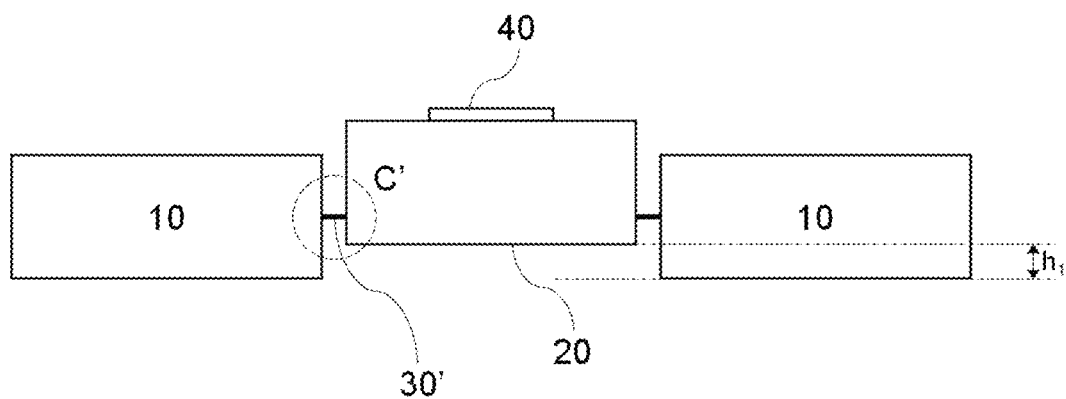
FIG. 9 is a side view of the floating structure for solar power generating on water viewed from a direction A-A' of FIG. 8.

FIG. 8 is a plan view of a floating structure for solar power generating on water according to another embodiment of the present invention. FIG. 9 is a side view of the floating structure for solar power generating on water viewed from a direction A-A' of FIG. 8. Referring to FIGS. 8 and 9, the floating structure for solar power generating on water according to the embodiment of the present invention may include two or more unit lines U, the two or more unit lines U including at least one main buoyancy body 10 and at least one auxiliary buoyancy body 20 arranged in the transverse direction and the two or more unit lines U being arranged in the longitudinal direction, a connection member 30' for connecting the main buoyancy body 10, the auxiliary buoyancy body 20, and the unit lines U at the same time so that the bottom surface of the main buoyancy body 10 is located lower than the bottom surface of the auxiliary buoyancy body 20, and a platform 40 for connecting two or more main buoyancy bodies 10 and/or the auxiliary buoyancy bodies 20 included in adjacent unit lines U in the longitudinal direction. That is, the single connection member 30' may not only connect the main buoyancy body 10 to the auxiliary buoyancy body 20, which are adjacent to each other, in the transverse direction, but also connect adjacent unit units U at the same time in the longitudinal direction.

Figure 10:
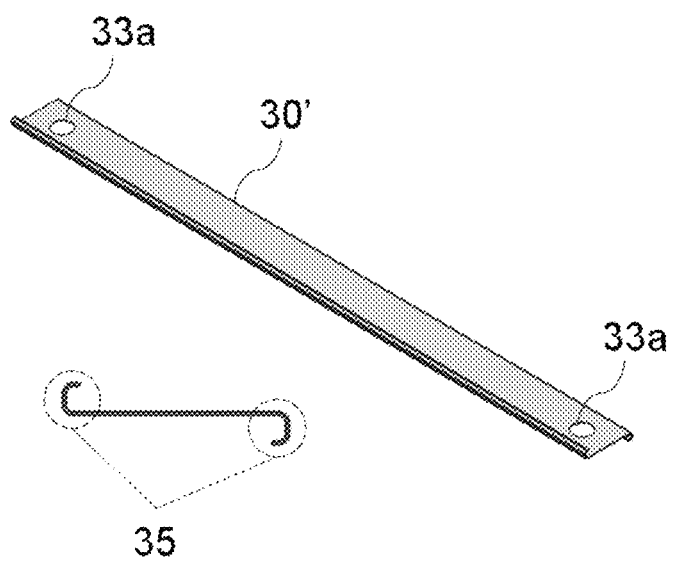
FIG. 10 shows a connection member according to another embodiment of the present invention.

FIG. 10 shows a connection member 30' according to another embodiment of the present invention. Referring to FIG. 10, the connection member 30' may include third fastening portions 33a provided at both ends of the support portion 31, and an angle θ formed by the extension line L of the third fastening portions 33a and the support portion 31 may be 0°. That is, the support portion 31 and the third fastening portion 33a of the connection member 30' may be coplanar.

Both side ends of the connection member 30' facing the main buoyancy body 10 and the auxiliary buoyancy body 20 may include ⊂-shaped bent portions 35 bent in opposite directions. The ⊂-shaped bent portions 35 may provide spaces into which the first and second fastening portions 10a and 20a of the main buoyancy body 10 and the auxiliary buoyancy body 20 are inserted, and preferably, insertion-coupled, thereby contributing to improving the coupling force of the first and second fastening portions 10a and 20a and the connection member 30'. In addition, when the ⊂-shaped bent portions 35 are consecutively formed in the entire region of both side ends of the connection member 30', the strength and durability of the connection member 30' may be improved.

Figure 11:
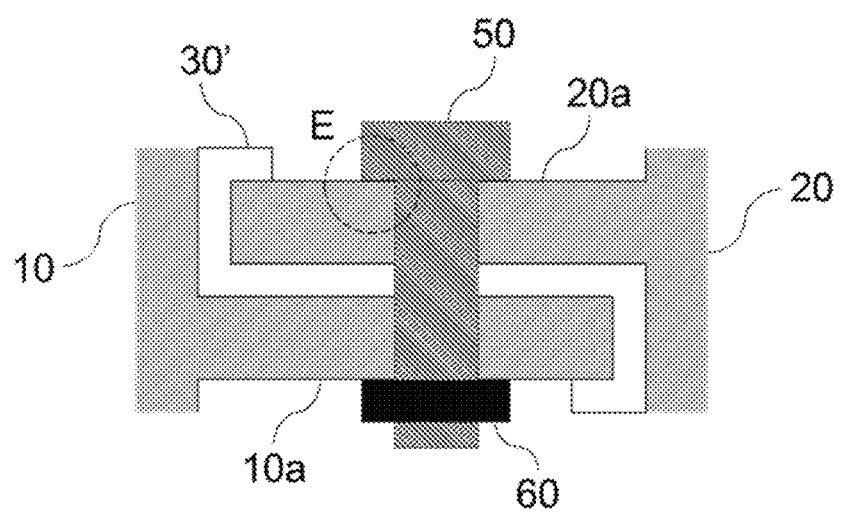
FIG. 11 is an enlarged view of region C' of FIG. 9.

FIG. 11 is an enlarged view of region C' of FIG. 9. Referring to FIG. 11, when the second fastening portion 20a of the auxiliary buoyancy body 20 is fitted to the ⊂-shaped bent portion 35, which is located on the left side of the connection member 30' and is bent upward, and the first fastening portion 10a of the main buoyancy body 10 is fitted to the ⊂-shaped bent portion 35, which is located on the right side of the connection member 30' and is bent downward, a predetermined connection pin 50 may be inserted into at least one through hole provided in the first to third fastening portions 10a, 20a, and 30a, and a predetermined nut 60 may be fastened to a first threaded portion of the connection pin 50. A washer 70 capable of reinforcing the airtightness of the head portion of the connection pin 50 and/or the nut 60 and the resulting coupling force may be interposed at any position between the head portion and the nut 60, as needed. The connection pin 50 and the nut 60 will be described below.

The support portion 31 of the connection members 30 and 30' may be a metal plate, and preferably, a metal plate having predetermined elasticity. When the floating structure is applied to the sea, and when the metal plate does not have elasticity, the load applied to the main buoyancy body 10 and/or the auxiliary buoyancy body 20 may not be appropriately buffered according to climate change, wave strength, height, etc. When such a load exceeds a threshold, cracks may occur in the connection members 30 and 30', or the connection members 30 and 30' may be damaged. In addition, when the connection members 30 and 30' are damaged in series, the burden for maintenance of the floating structure may be increased.

Figure 12A:
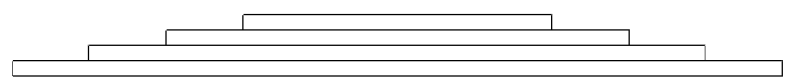
FIGS. 12A and 12B show a support portion of a connection member according to an embodiment of the present invention.
Figure 12B:
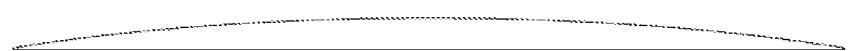

FIGS. 12A and 12B show a support portion 31 of a connection member according to an embodiment of the present invention. Referring to FIG. 12A, the support portion 31 may be formed of a leaf spring in which two or more metal plates having different lengths are stacked. A single metal plate included in the leaf spring may also have predetermined elasticity. The metal plate included in the leaf spring may supplement the rigidity of other metal plates located above and below the leaf spring. In addition, the stacking position of the metal plates and the thickness of each portion of the leaf spring may be accordingly adjusted and thus, a spring constant according to the applied load region may vary.

Referring to FIG. 12B, the support portion 31 may be formed of a resin leaf spring whose thickness decreases in a direction from the center to both ends. The thickness of the center portion of the support portion 31 may be designed to be greater than the thickness of an end portion, so that resistance against attractive force and/or repulsive force applied to the support portion 31 according to climate change, wave strength, and height, etc may be improved. Such a thickness gradient may be continuously applied in a form having a predetermined curvature and/or a straight line as shown in FIG. 12B and may be provided intermittently through one or more step heights.

The resin leaf spring may be manufactured using a resin containing fiber-reinforced plastic (FRP). Unlike metal leaf springs, the resin leaf spring may change the cross-sectional area thereof according to the length of the spring. In addition, even though the resin leaf spring is a single plate, the resin leaf spring may realize the same performance as a metal leaf spring and may maximize the effect of weight reduction.

When the support portion 31 is made of a leaf spring in which two or more metal plates having different lengths are stacked or made of a resin leaf spring whose thickness decreases in a direction from the center to both ends, the thick center of the support portion 31 may contribute to improving the durability of the floating structure by adequately buffering the load applied to the connection members 30 and 30'.

Figure 13:
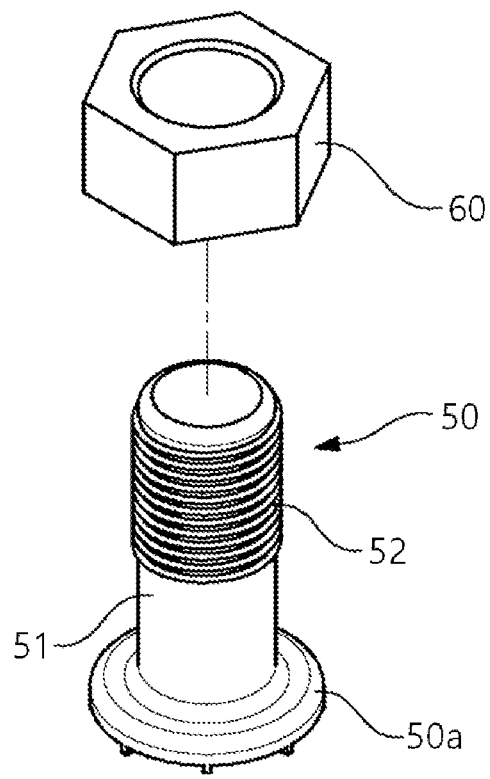
FIGS. 13 and 14 show a connection pin according to an embodiment of the present invention.
Figure 14:
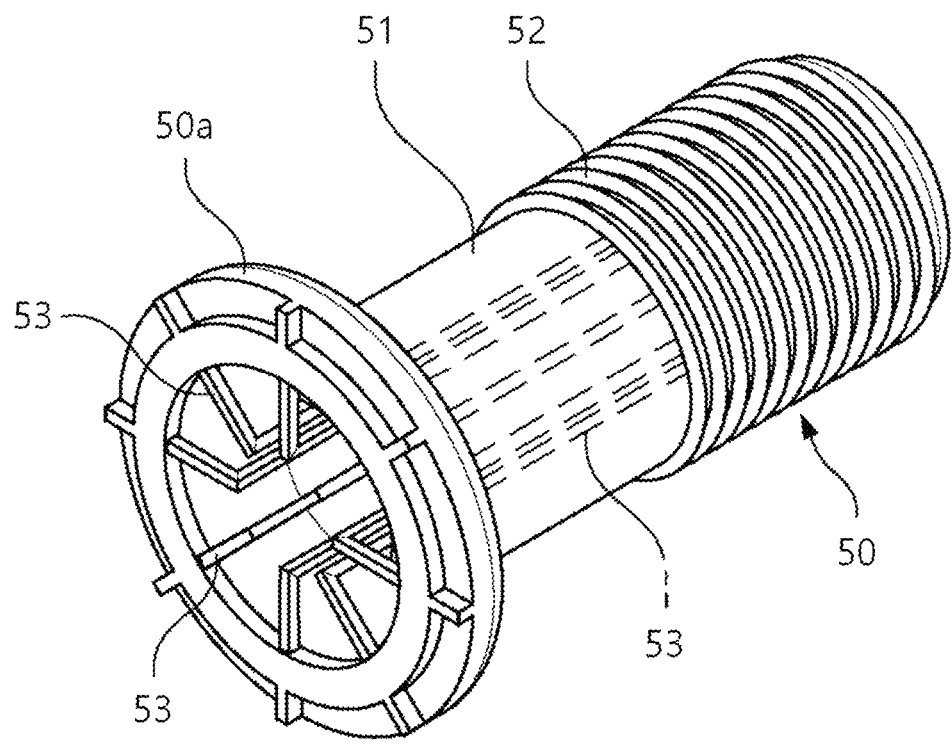

FIGS. 13 and 14 show a connection pin according to an embodiment of the present invention. Referring to FIGS. 7, 11, 13, and 14, the connection pin may be inserted into a portion where two or more of the first to third fastening portions 10a, 20a, 32, 33 and 33a overlap and may include a first head portion 50a, a shank portion 51, a first threaded portion 52 provided in certain regions, and two or more reinforcing ribs 53 provided at predetermined intervals in the circumferential direction of a hollow at at least a portion of an inner wall of the hollow passing through the first head portion 50a, the shank portion 51, and the first threaded portion 52.

The shank portion 51 and the reinforcing ribs 53 may properly prevent the connection pin 50 from being damaged by an external force by increasing the strength of the connection pin 50. The reinforcing ribs 53 may have a thickness and a length that are enlarged by the range of the shank portion 51 to provide rigidity to the connection pin 50.

Figure 15A:
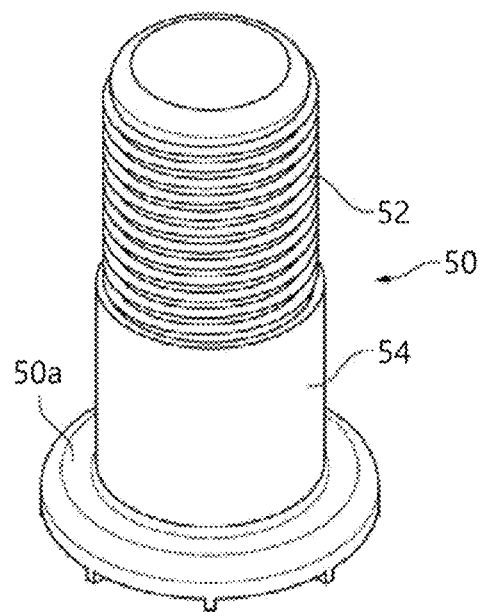
FIGS. 15A and 15B show a reinforcing member of a connection pin according to an embodiment of the present invention.
Figure 15B:
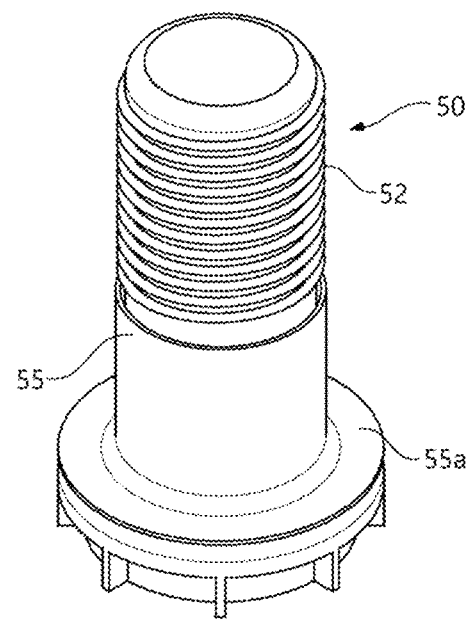

FIGS. 15A and 15B show a reinforcing member of a connection pin 50 according to an embodiment of the present invention. Referring to FIG. 15A, the connection pin 50 may further include a cylindrical reinforcing member 54 located on the outer circumferential surface of the shank portion 51 to further reinforce the rigidity of the shank portion 51. The reinforcing member 54 may be inserted onto the shank portion 51 of the connection pin 50 or provided integrally with the shank portion 51 to reinforce the connection pin 50, and the specifications of the reinforcing member 54 may be designed to cover the entire shank portion 51. Preferably, the diameter, specifically, the outer diameter of the reinforcing member 54 may be greater than the diameter of the first threaded portion 52. In addition, when the reinforcing member 54 is inserted onto the shank portion 51, the inner diameter of the reinforcing member 54 may be substantially the same as the diameter of the shank portion 51.

Referring to FIG. 15B, as another embodiment of the reinforcing member 54, a satgat-shaped reinforcing member 55 may be inserted onto the outer peripheral surface of the shank portion 51. The satgat-shaped reinforcing member 55 has a reinforcing flange 55a formed at a lower end thereof in a circumferential direction to cover the first head portion 50a of the connection pin 50, thereby further reinforcing the rigidity of the first head portion 50a of the connection pin 50.

The reinforcing members 54 and 55 may be made of plastic and/or a metal. The reinforcing members 54 and 55 are formed of a cylindrical ring and are inserted onto the shank portion 51 of the connection pin 50 or provided integrally with the shank portion 51 to further reinforce the rigidity of the shank portion 51.

Figure 16A:
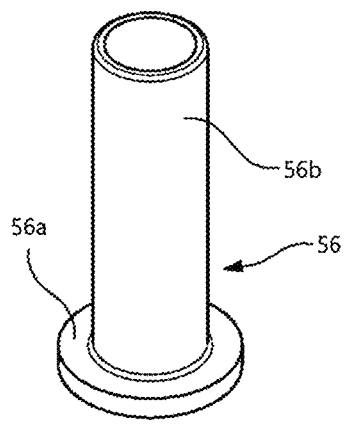
FIGS. 16A and 16B show a core reinforcing member and a connection pin including the same according to an embodiment of the present invention.
Figure 16B:
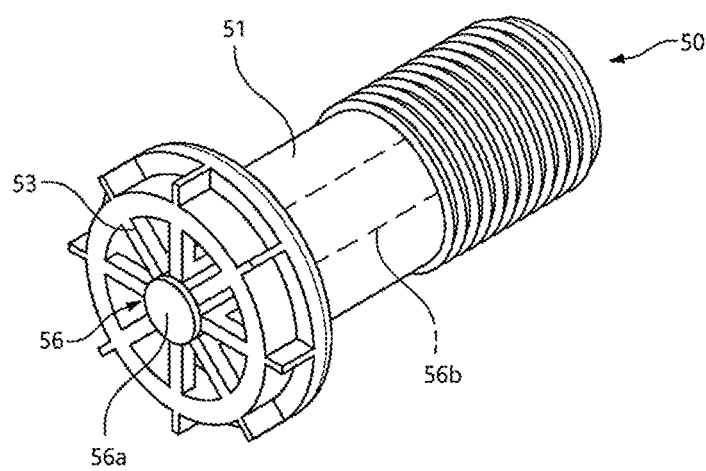

FIGS. 16A and 16B show a core reinforcing member 56 and a connection pin 50 including the same according to an embodiment of the present invention. Referring to FIGS. 16A and 16B, the connection pin 50 may further include the core reinforcing member 56 that is inserted into the hollow of the connection pin 50 while in contact with the reinforcing ribs 53 inside the shank portion 51 and that further reinforces the overall rigidity of the shank portion 51 and the connection pin 50 including the same. The core reinforcing member 56 may be made of a pin-shaped plastic and/or a metal and may be inserted and fixed in the hollow of the connection pin 50 to reinforce the inside of the connection pin 50.

Referring to FIG. 16A, the core reinforcing member 56 may include a disk-shaped second head portion 56a and a cylindrical body portion 56b extending from the second head portion 56a. Referring to FIG. 16B, the body portion 56b of the core reinforcing member 56 may be inserted into the hollow of the connection pin 50 formed by the reinforcing ribs 53, thereby further reinforcing the inside of the connection pin 50. The second head portion 56a of the core reinforcing member 56 may be press-fitted to firmly fix the core reinforcing member 56 to the inside of the connection pin 50.

Figure 17A:
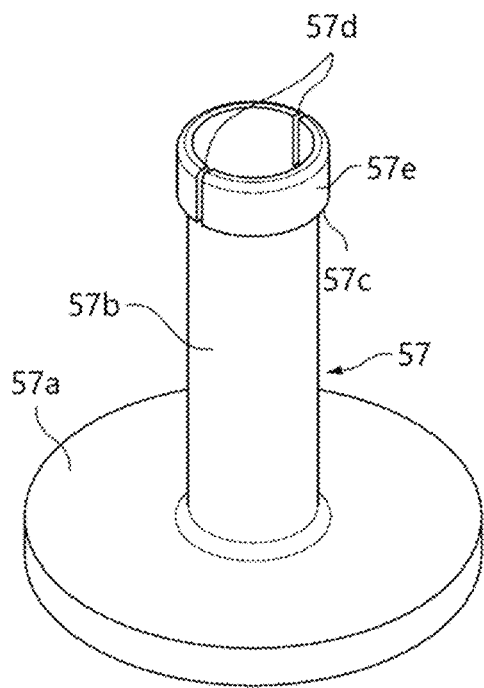
FIGS. 17A to 17C show a core reinforcing member and a connection pin including the same according to another embodiment of the present invention.
Figure 17B:
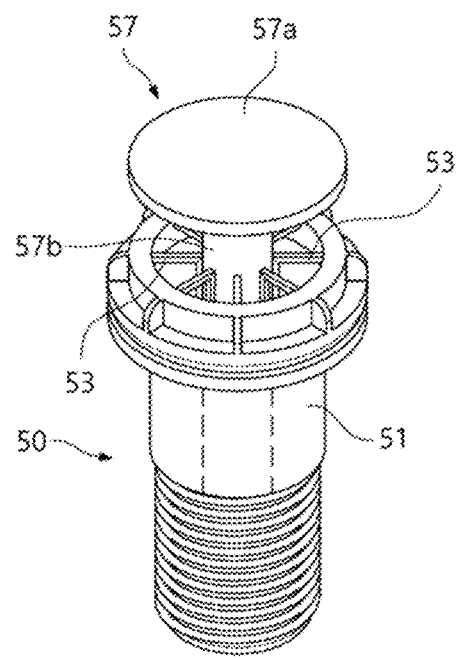
Figure 17C:
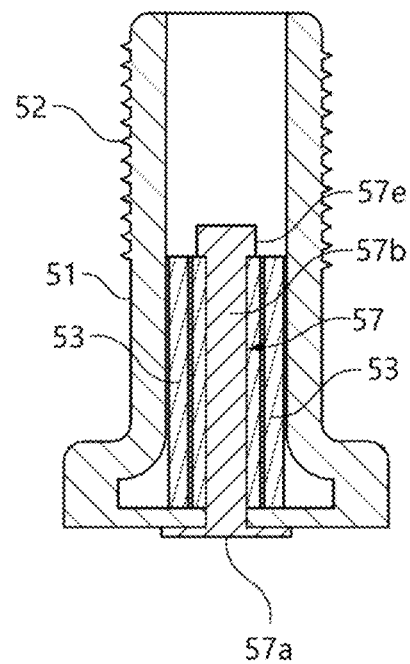

FIGS. 17A to 17C show a core reinforcing member 57 and a connection pin 50 including the same according to another embodiment of the present invention. Specifically, FIG. 17A shows the core reinforcing member 57 according to another embodiment of the present invention, FIG. 17B shows a method in which the core reinforcing member 57 is coupled to the connection pin 50, and FIG. 17C shows a state in which the core reinforcing member 57 is completely inserted into the connection pin 50 and fixed thereto.

Referring to FIG. 17A, the core reinforcing member 57 may include a disk-shaped second head portion 57a, a cylindrical body portion 57b extending from the second head portion 57a, a stepped portion 57c formed at the end of the body portion 57b, and a fixing portion 57e that is caught and fixed by the reinforcing ribs 53. The fixing portion 57e may include a plurality of cut portions 57d that allow the end of the body portion 57b to be easily deformed in the center direction of the body portion 57b.

Referring to FIGS. 17B and 17C, the body portion 57b of the core reinforcing member 57 may be inserted into the hollow of the connection pin 50 with the plurality of cut portions 57d closed, and when the cut portion 57d of the completely-inserted body portion 57b restores the original shape before being closed, the end portion of the reinforcing ribs 53 is caught on the fixing portion 57e and fixed thereto, so that the core reinforcing member 57 does not fall off the connection pin 50. The core reinforcing member 57 may be firmly maintained to be inserted into the connection pin 50 through the fixing portion 57e formed at an end of the core reinforcing member 57.

Figure 18:
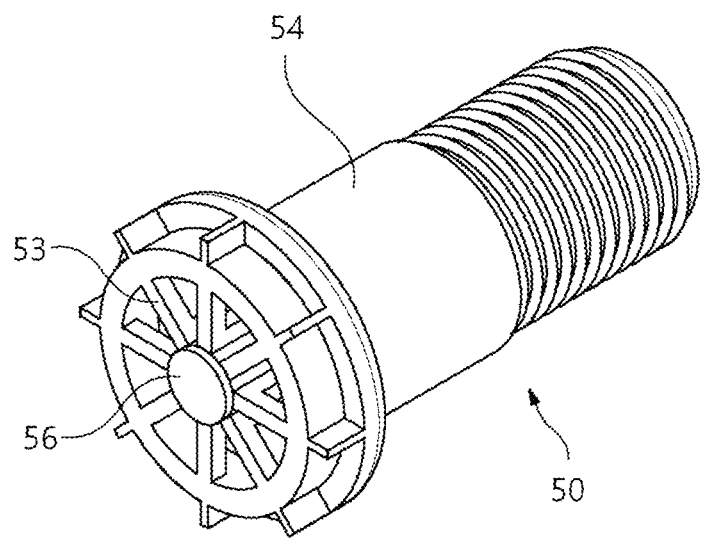
FIG. 18 shows a connection pin including a reinforcing member and a core reinforcing member according to an embodiment of the present invention.

FIG. 18 shows a connection pin 50 including a reinforcing member 54 and a core reinforcing member 56 according to an embodiment of the present invention. Referring to FIG. 18, in the connection pin 50, the reinforcing member 54 may be inserted onto the outer circumferential surface of the shank portion 51 or the reinforcing member 54 may be integrally provided, and the core reinforcing member 56 may be inserted into the shank portion 51 to reinforce the shank portion 51. That is, the reinforcing member 54 surrounding the shank portion 51 may be provided to reinforce the connection pin 50, and the core reinforcing member 56 reinforcing the inside of the connection pin 50 may be provided.

The shank portion 51 and the reinforcing member 54 may reinforce the outside of the connection pin 50, and the core reinforcing member 56 inserted into and fixed to the hollow of the connection pin 50 while in contact with the reinforcing ribs 53 may reinforce the inside of the connection pin 50, thereby maximizing the shear strength of the connection pin 50.

Figure 19A:
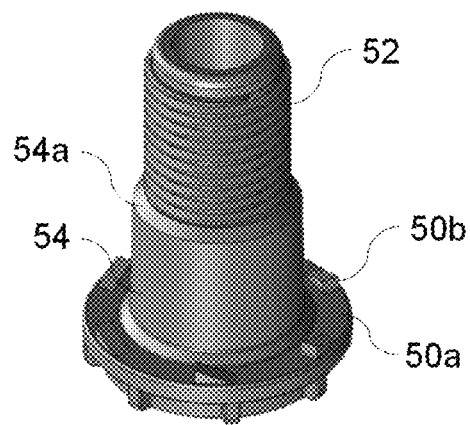
FIGS. 19A and 19B show a connection pin and a nut according to another embodiment of the present invention.
Figure 19B:
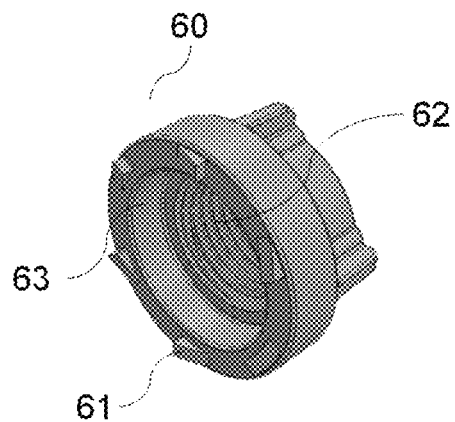

FIGS. 19A and 19B show a connection pin 50 and a nut 60 according to another embodiment of the present invention. Referring to FIG. 19A, one end of the reinforcing member 54 may further include a tapered portion 54a extending to the first threaded portion 52 while a diameter of the tapered portion 54a gradually decreases. When the connection pin 50 is inserted into at least one of the first to third fastening portions 10a, 20a, 32, 33, and 33a, the tapered portion 54a allows the first threaded portion 52 of the connection pin 50 and the reinforcing member 54 provided on the outer circumferential surface of the shank portion 51 to be sequentially and smoothly inserted, and at the same time, the coupling force of the connection pin 50 and the fastening portion may be further reinforced.

Figure 20:
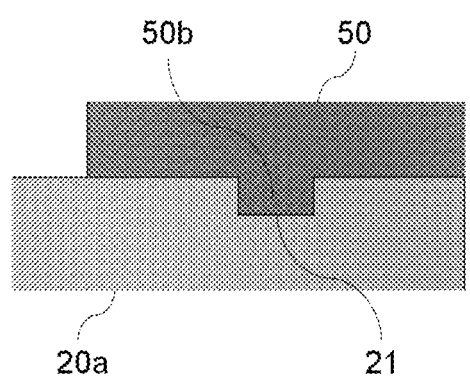
FIG. 20 is an enlarged view of region E of FIG. 11.

FIG. 20 is an enlarged view of region E of FIG. 11. Referring to FIGS. 19A, 19B, and 20, a surface of the first head portion 50a facing at least one of the first to third fastening portions 10a, 20a, 32, 33, and 33a may include at least one first protrusion 50b formed in a circumferential direction, and at least one surface of at least one of the first to third fastening portions 10a, 20a, 32, 33, and 33a may include at least one concave groove 21.

Since the first protrusion 50b provided in the first head portion 50a is inserted into the concave groove 21 included in at least one surface of the fastening portion while the connection pin 50 is inserted into the fastening portion and thus fixes the connection pin 50 and the fastening portion to each other, unnecessary clearance and/or rotation that may occur when the connection pin 50 is inserted into the fastening portion, can be prevented.

In addition, when at least one surface of at least one of the first to third fastening portions 10a, 20a, 32, 33, and 33a includes two or more concave grooves formed with predetermined specifications and intervals, at least one surface of at least one of the first to third fastening portions 10a, 20a, 32, 33, and 33a inevitably includes one or more protrusions formed between these concave grooves with predetermined specifications and intervals. For example, when the first fastening portion and the second fastening portion are stacked or combined with each other, the concave groove 21 formed in one surface of the first fastening portion may accommodate a protrusion formed on one surface of the second fastening portion facing the concave groove and may fix the main buoyancy body 10 and the auxiliary buoyancy body 20 to each other in a preset position even in a state in which the connection pin 50 is not inserted.

Referring to FIG. 19B, the connection pin 50 may further include a nut 60 fastened to the first threaded portion 52, and a surface of the nut 60 facing at least one of the first to third fastening portions may include at least one second protrusion 61 formed in a circumferential direction, and an inner circumferential surface of the nut 60 may include a second threaded portion 62 that is mutually fastened to the first threaded portion 52 of the connection pin 50, and a smooth portion 63 having a greater diameter than the second threaded portion 62.

Since the second protrusion 61 provided on a surface of the nut 60 that faces at least one of the first to third fastening portions may be inserted into the concave groove 21 included in at least one surface of the fastening portion in a state in which the nut 60 is fastened to the connection pin 50 and may fix the nut 60 and the fastening portion to each other, unnecessary clearance and/or rotation that may occur when the nut 60 is fastened to the fastening portion, can be prevented.

Since the diameter of the smooth portion 63 is greater than the diameter of the second threaded portion 62, the nut 60 may pass through the first threaded portion 52 of the connection pin 50 and may enter the shank portion 51 and/or the reinforcing member 54. In this case, even when the entire thickness of at least one fastening portion fastened to the shank portion 51 and/or the reinforcing member 54 of the connection pin 50 is less than the height of the shank portion 51 and/or the reinforcing member 54, the nut 60 may reach a position where the nut 60 is in contact with the fastening portion, thereby completely fixing the fastening portion.

The floating structure for solar power generating on water according to an aspect of the present invention includes two or more unit lines disposed in parallel, the two or more unit lines including a main buoyancy body, an auxiliary buoyancy body, and a connection member for connecting the main buoyancy body to the auxiliary buoyancy body so that the bottom surface of the main buoyancy body is located lower than the bottom surface of the auxiliary buoyancy body, and a platform for connecting two or more auxiliary buoyancy bodies included in adjacent unit lines to each other, so that the concern of environment pollution that can occur around a solar power generating system on water can be eliminated and, at the same time, resistance against external force and durability can be improved.

In addition, by using the connection pin for fastening each component of the floating structure for solar power generating on water and the material and structure of the connection member, the resistance against external force and durability of the floating structure for solar power generating on water can be further improved.

The effects of the present invention are not limited to the above effects, and should be understood to include all effects that can be inferred from the configuration of the invention described in the detailed description or the scope of claims of the present invention.

The above description of the present invention is for illustrative purposes only, and those of ordinary skill in the art to which the present invention pertains will be able to understand that other specific forms can be easily modified without changing the technical spirit or essential features of the present invention. Therefore, it should be understood that the embodiments described above are illustrative and non-limiting in all respects. For example, each component described as a single type may be implemented in a distributed manner, and similarly, components described as being distributed may also be implemented in a combined form.

The scope of the present invention is indicated by the claims to be described below, and all changes or modified forms derived from the meaning and scope of the claims and the concept of equivalents thereof should be construed as being included in the scope of the present invention.

What is claimed is:

1. A floating structure for solar power generating on water, the floating structure comprising:

two or more unit lines comprising at least one main buoyancy body and at least one auxiliary buoyancy body arranged in a transverse direction, the two or more unit lines being arranged in a longitudinal direction;

a connection member configured to connect the main buoyancy body to the auxiliary buoyancy body so that the bottom surface of the main buoyancy body is located lower than the bottom surface of the auxiliary buoyancy body; and a platform configured to connect two or more auxiliary buoyancy bodies included in adjacent unit lines in the longitudinal direction, wherein one or more ends of the main buoyancy body and the auxiliary buoyancy body include a first fastening portion and a second fastening portion configured to fasten two or more of the main buoyancy body and the auxiliary buoyancy body, and the connection member comprises a support portion and third fastening portions provided at both ends of the support portion, wherein a bottom surface of the main buoyancy body comprises a first concave portion and a second concave portion, which are formed in a direction perpendicular to the unit lines and in a direction parallel to the unit lines, respectively, and wherein at least one surface of at least one of the first to third fastening portions comprises at least one concave groove.

2. The floating structure of claim 1, wherein a top surface of at least one of the first and second concave portions is located higher than a bottom surface of the auxiliary buoyancy body.

3. The floating structure of claim 1, wherein the connection member connects the main buoyancy body and the auxiliary buoyancy body included in the unit lines in the transverse direction, and an angle θ formed by an extension line of the fastening portion and the support portion is 90° or less.

4. The floating structure of claim 1, wherein the connection member connects the unit lines adjacent to each other in the longitudinal direction.

5. The floating structure of claim 4, wherein both side ends of the connection member facing the main buoyancy body and the auxiliary buoyancy body comprise ⊂-shaped bent portions bent in opposite directions.

6. The floating structure of claim 1, wherein the support portion comprises a metal plate.

7. The floating structure of claim 1, wherein the support portion comprises a leaf spring in which two or more metal plates having different lengths are stacked.

8. The floating structure of claim 1, wherein the support portion comprises a resin leaf spring whose thickness decreases in a direction from a center to both ends.

9. The floating structure of claim 1, wherein the platform and the auxiliary buoyancy body are coupled by a fourth fastening portion that rotates around at least one axis.

10. The floating structure of claim 1, further comprising a connection pin inserted into a portion where two or more of the first to third fastening portions overlap, wherein the connection pin comprises:
a first head portion;
a shank portion;
a first threaded portion; and
two or more reinforcing ribs provided at predetermined intervals in a circumferential direction of a hollow at at least a portion of an inner wall of the hollow passing through the first head portion, the shank portion, and the first threaded portion.

11. The floating structure of claim 10, wherein the connection pin further comprises a reinforcing member located on an outer circumferential surface of the shank portion so as to reinforce the shank portion.

12. The floating structure of claim 11, wherein a diameter of the reinforcing member is greater than a diameter of the first threaded portion, and one end of the reinforcing member further comprises a tapered portion extending to the first threaded portion while a diameter of the tapered portion gradually decreases.

13. The floating structure of claim 12, wherein the other end of the reinforcing member comprises a reinforcing flange formed in a circumferential direction so as to reinforce the first head portion of the connection pin.

14. The floating structure of claim 10, wherein the connection pin further comprises a core reinforcing member, which is inserted into the hollow while in contact with the reinforcing ribs, so as to reinforce the shank portion.

15. The floating structure of claim 14, wherein the core reinforcing member comprises a second head portion and a body portion extending from the second head portion.

16. The floating structure of claim 10, wherein a surface of the first head portion facing at least one of the first to third fastening portions comprises at least one first protrusion formed in a circumferential direction.

17. The floating structure of claim 10, wherein the connection pin further comprises a nut fastened to the first threaded portion, a surface of the nut facing at least one of the first to third fastening portions comprises at least one second protrusion formed in a circumferential direction, and an inner circumferential surface of the nut comprises a second threaded portion and a smooth portion having a greater diameter than a diameter of the second threaded portion.

* * * * *